(12) United States Patent
Perry et al.

(10) Patent No.: US 10,598,783 B2
(45) Date of Patent: Mar. 24, 2020

(54) MULTI-FREQUENCY UNWRAPPING

(71) Applicant: Microsoft Technology Licensing, LLC, Redmond, WA (US)

(72) Inventors: Travis Perry, Menlo Park, CA (US); Mirko Schmidt, San Francisco, CA (US); John Godbaz, Mountain View, CA (US); Michael Fenton, Palo Alto, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 297 days.

(21) Appl. No.: 15/204,733

(22) Filed: Jul. 7, 2016

(65) Prior Publication Data

US 2018/0011195 A1    Jan. 11, 2018

(51) Int. Cl.
*G01S 17/32* (2006.01)
*G06F 17/10* (2006.01)
*G01S 17/89* (2006.01)
*G01S 17/36* (2006.01)

(52) U.S. Cl.
CPC ............ *G01S 17/325* (2013.01); *G01S 17/36* (2013.01); *G01S 17/89* (2013.01); *G06F 17/10* (2013.01)

(58) Field of Classification Search
None
See application file for complete search history.

(56) References Cited

U.S. PATENT DOCUMENTS

| | | | |
|---|---|---|---|
| 5,745,437 A | 4/1998 | Wachter et al. | |
| 6,316,934 B1 | 11/2001 | Amorai-Moriya et al. | |
| 7,450,220 B2 | 11/2008 | O'Connor et al. | |
| 7,545,516 B2 | 6/2009 | Jia et al. | |
| 7,791,715 B1 | 9/2010 | Bamji | |
| 7,936,449 B1 | 5/2011 | Bamji et al. | |
| 8,274,037 B2 | 9/2012 | Ritter et al. | |
| 8,482,722 B2 | 7/2013 | Min et al. | |
| 8,514,269 B2 | 8/2013 | Adler et al. | |

(Continued)

FOREIGN PATENT DOCUMENTS

WO    2013010913 A1    1/2013

OTHER PUBLICATIONS

Lilienblum, et al, "Optical 3D Surface Reconstruction by a Multi-Period Phase Shift Method", Apr. 2007, Journal of Computers, vol. 2, No. 2, pp. 73-83.*

(Continued)

*Primary Examiner* — Alexander Satanovsky
*Assistant Examiner* — Brent A. Fairbanks
(74) *Attorney, Agent, or Firm* — Holzer Patel Drennan

(57) ABSTRACT

The time-of-flight system disclosed herein includes a frequency unwrapping module configured to generate an input phase vector with M phases corresponding to M sampled signals from an object, determine an M−1 dimensional vector of transformed phase values by applying a transformation matrix (T) to the input phase vector, determine an M−1 dimensional vector of rounded transformed phase values by rounding the transformed phase values to a nearest integer, and determine a one dimensional lookup table (LUT) index value by transforming the M−1 dimensional rounded transformed phase values. The index value is input into the one dimensional LUT to determine a range of the object.

18 Claims, 10 Drawing Sheets

(56) References Cited

U.S. PATENT DOCUMENTS

| | | | |
|---|---|---|---|
| 8,629,976 B2 | 1/2014 | Hui et al. | |
| 9,681,123 B2 | 6/2017 | Perry et al. | |
| 2006/0241371 A1 | 10/2006 | Rafii et al. | |
| 2007/0182949 A1 | 8/2007 | Niclass | |
| 2008/0309914 A1 | 12/2008 | Cantin et al. | |
| 2009/0115995 A1 | 5/2009 | Bamji et al. | |
| 2010/0165322 A1* | 7/2010 | Kane | G01S 7/481 356/4.01 |
| 2011/0188028 A1 | 8/2011 | Hui et al. | |
| 2011/0292370 A1 | 12/2011 | Hills et al. | |
| 2012/0013887 A1 | 1/2012 | Xu et al. | |
| 2012/0092485 A1 | 4/2012 | Meinherz et al. | |
| 2012/0315965 A1 | 12/2012 | Bathiche | |
| 2013/0116977 A1 | 5/2013 | Godbaz et al. | |
| 2013/0222550 A1* | 8/2013 | Choi | G01S 17/023 348/47 |
| 2014/0049767 A1 | 2/2014 | Benedetti et al. | |
| 2014/0079248 A1 | 3/2014 | Short et al. | |
| 2014/0160459 A1 | 6/2014 | Huber et al. | |
| 2014/0168369 A1 | 6/2014 | Crane et al. | |
| 2014/0313376 A1 | 10/2014 | Van Nieuwenhove et al. | |
| 2015/0193938 A1 | 7/2015 | Freedman et al. | |
| 2016/0047913 A1 | 2/2016 | Lamesch et al. | |

OTHER PUBLICATIONS

Lilienblum, et al, "Optical 3D Surface Reconstruction by a Multi-Period Phase Shift Method", Apr. 2007, Journal of Computers, vol. 2, No. 2, pp. 73-83 (Year: 2007).*

Ding, et al., "Absolute Phase Recovery of Three Fringe Patterns with Selected Spatial Frequencies", In Journal of Optics and Lasers in Engineering, vol. 70, Jul. 31, 2015, pp. 18-25.

Falie, et al., "Wide Range Time of Flight Camera for Outdoor Surveillance", In Proceedings of Microwaves, Radar and Remote Sensing Symposium(MRRS), Sep. 22, 2008, pp. 79-82.

Lilienblum, et al., "Optical 3D Surface Reconstruction by a Multi-Period Phase Shift Method", In Journal of Computers,vol. 2, Issue 2, Apr. 2007, pp. 73-83.

"International Search Report and Written Opinion Issued in PCT Application No. PCT/US2017/040159", dated Nov. 23, 2017, Sep. 22, 2008, 15 Pages.

Pribanić, et al., "Efficient Multiple Phase Shift Patterns for Dense 3D Acquisition in Structured Light Scanning", In Journal Image and Vision Computing, vol. 28, Issue 8, Aug. 31, 2010, pp. 1255-1266.

Ding, et al., "Recovering the Absolute Phase Maps of Two Fringe Patterns with Selected Frequencies", In Journal of Optics Letter, vol. 36, Issue 13, Jul. 1, 2011, pp. 2518-2520.

Zhang, et al., "Fusion of Time-of-Flight and Phase Shifting for High-Resolution and Low-Latency Depth Sensing", In IEEE International Conference on Multimedia and Expo, Jun. 29, 2015, 6 Pages.

Zuo, et al., "Temporal Phase Unwrapping Algorithms for Fringe Projection Profilometry: A Comparative Review", In Journal of Optics and Lasers in Engineering, vol. 85, Oct. 31, 2016, pp. 84-103.

Droeschel, et al., "Multi-frequency Phase Unwrapping for Time-of-Flight cameras", In Proceedings of IEEE/RSJ International Conference on Intelligent Robots and Systems, Oct. 18, 2010, pp. 1463-1469.

Kirmani, et al., "Spumic: Simultaneous Phase Unwrapping and Multipath Interference Cancellation in Time-Of-Flight Cameras Using Spectral Methods", In Proceedings of IEEE International Conference on Multimedia and Expo, Jul. 15, 2013, 6 pages.

Xu, et al., "Phase-unwrapping of SAR Interferogram with Multi-frequency or Multi-baseline", In Proceedings of International Surface and Atmospheric Remote Sensing: Technologies, Data Analysis and Interpretation, Aug. 8, 1994, pp. 730-732.

Freedman, et al., "SRA: Fast Removal of General Multipath forToF Sensors", In Journal of Computing Research Repository, Mar. 2014, pp. 1-15.

"Non Final Office Action Issued in U.S. Appl. No. 13/586,391", dated Sep. 18, 2014, 7 Pages.

"Final Office Action Issued in U.S. Appl. No. 14/245,751", dated May 20, 2016, 9 Pages.

"Non Final Office Action Issued in U.S. Appl. No. 14/245,751", dated Jan. 25, 2016, 8 Pages.

Fuchs, et al., "Extrinsic and Depth Calibration of ToF-Cameras", In Proceedings of the IEEE Conference on Computer Vision and Pattern Recognition, Jun. 23, 2008, 6 Pages.

McClure, et al., "Resolving depth measurement ambiguity with commercially available range imaging cameras", In Proceedings of the Image Processing: Machine Vision Applications III, vol. 7358, Jan. 29, 2010, 12 Pages.

Petrovic, et al., "Very loopy belief propagation for unwrapping phase images", In Proceedings of the Advances in Neural Information Processing Systems, Jan. 1, 2002, 7 Pages.

Santrac, et al., "High Resolution Segmentation with a Time-of-Flight 3D-Camera using the Example of a lecture scene", Published in Fachbereich mathematik and informatik, Sep. 1, 2006, 9 Pages.

* cited by examiner

MULTI-FREQUENCY UNWRAPPING

BACKGROUND

Time-of-flight (ToF) systems produce a depth image of an object, each pixel of such image encoding the distance to the corresponding point in the object. In recent years, time-of-flight depth-imaging technology has become more accurate and more affordable. These advances are a consequence of improved imaging array fabrication and intelligent post-processing, which garners improved signal-to-noise levels from output of the imaging array.

SUMMARY

Implementations described herein disclose a time-of-flight system to determine a range of an object. The time-of-flight system includes a frequency unwrapping module configured to generate an input phase vector with M phases corresponding to M sampled signals reflected from an object, determine an M−1 dimensional vector of transformed phase values by applying a transformation matrix (T) to the input phase vector, determine an M−1 dimensional vector of rounded transformed phase values by rounding the transformed phase values to a nearest integer, and determine a one dimensional lookup table (LUT) index value by transforming the M−1 dimensional rounded transformed phase values. The index value is input into the one dimensional LUT to determine a range of the object.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Other implementations are also described and recited herein.

BRIEF DESCRIPTIONS OF THE DRAWINGS

DETAILED DESCRIPTIONS

Figure 1:
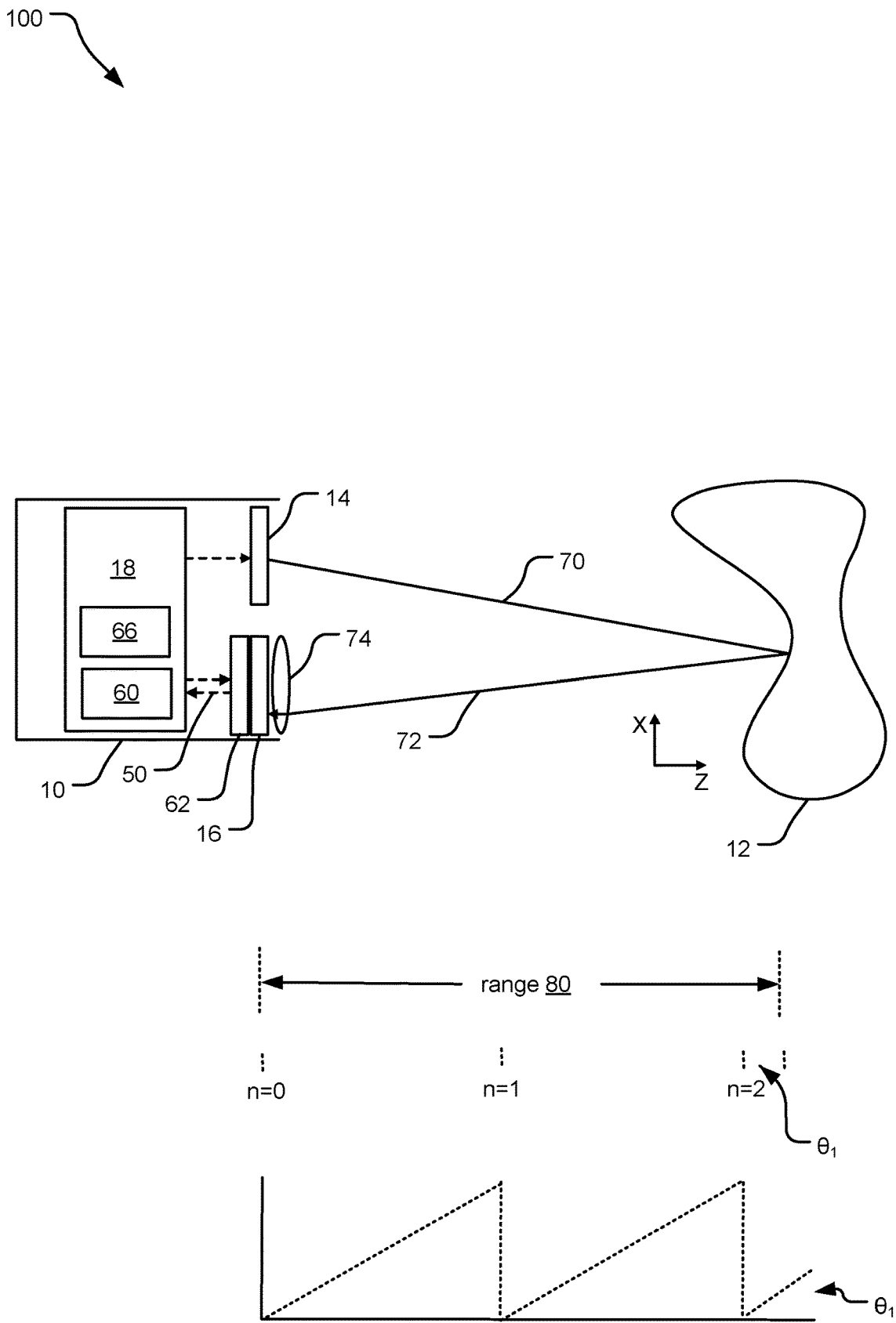
FIG. 1 illustrates an example implementation of a ToF system disclosed herein.

Aspects of this disclosure will now be described by example and with reference to the illustrated embodiments listed above. Components, process steps, and other elements that may be substantially the same in one or more embodiments are identified coordinately and are described with minimal repetition. It will be noted, however, that elements identified coordinately may also differ to some degree. It will be further noted that the drawing figures included in this disclosure are schematic and generally not drawn to scale. Rather, the various drawing scales, aspect ratios, and numbers of components shown in the figures may be purposely distorted to make certain features or relationships easier to see. In some embodiments the order of the flowchart operations may be altered, additional steps added or steps dropped.

Time-of-flight (ToF) systems produce a depth image of an object, each pixel of such image encoding the distance to the corresponding point in the object. In a ToF system one issue is that phase used to measure distance repeats or wraps at various distances based on the frequency, which is known as phase wrapping. At higher modulation frequencies the phase wrapping occurs at a shorter distance. This wrapping occurs due to the cyclic/modulo-$2\pi$ nature of a sinusoid or other repetitive waveform and unambiguous range measurements require some sort of approach to resolving this uncertainty. However, use of a higher modulation frequency provides improved depth noise and resolution. There are many methods to unwrap to a longer range, however, these methods are computationally expensive. While this disclosure focuses on light based amplitude modulated continuous wave ranging in this disclosure, the technology disclosed herein is also applicable to radar and other distance measurement techniques that rely upon phase detection of waveforms at different frequencies in order to range and will be obvious to those skilled in the art.

A frequency-unwrapping method disclosed herein provides both high accuracy and precision, and the compute is inexpensive even as the number of modulation frequencies increases. The technology disclosed herein is suitable for implementation with simple integer arithmetic unit hardware. In addition, the frequency-unwrapping method disclosed herein can handle greater than three modulation frequencies. As the number of modulation frequencies increases, the noise robustness of phase-unwrapping increases, thus the ability to handle an arbitrarily large number of frequencies is significantly advantageous. This also allows to push the values of the modulation frequencies higher, thus giving better precision. In other words, while higher number of frequencies may give the same robustness, using frequencies with higher values results in better precision. Specifically, the frequency-unwrapping method disclosed herein discloses unwrapping phases in a ToF system using an amplitude modulated continuous wave (AMCW) ToF range-imager.

FIG. 1 illustrates an implementation of a ToF system 100 using (AMCW) ToF range-imaging. The ToF system 100 includes a ToF camera 10 configured to image an object 12. In one implementation, the ToF camera 10 may be positioned from 0.1 to 5 meters away from object 12, though other depth ranges are contemplated as well. The ToF camera 10 used in connection with this disclosure are applicable to a broad range of object, from simple geometric structures such as walls, doors, and ceilings, to complex subjects such as human beings. In some scenarios, an imaged object 12 may include both foreground and background portions.

As shown in FIG. 1, the ToF camera 10 includes a light source 14 that generates a modulated light signal 70, an imaging array 16, and a controller 18. The ToF camera 10 may also include various other components, such as an objective lens 20 and/or wavelength filter, which may be set in front of the imaging array 16. The light source 14 is configured to illuminate the object 12 with modulated light signal 70. The modulated light signal 70 can be modulated according to virtually any periodic modulation waveform, including, but not limited to a sinusoidally modulated waveform. The nature of the light source 14 may differ in the various embodiments of this disclosure. In some embodiments, the light source 14 may include a modulated laser, such as an infrared (IR) or near-infrared (NIR) laser, e.g., an edge emitting laser or vertical-cavity surface-emitting laser (VCSEL). In other embodiments, the light source 14 may include one or more high-power light-emitting diodes (LEDs). Thus, the modulated light signal (70) may be modulated laser signal, thus providing an amplitude modulated continuous wave light detection and ranging (LIDAR) or an amplitude modulated continuous wave laser detection and ranging (LADAR).

The modulated light signal 70 is reflected from the object 12 and a reflected modulated signal 72 travels back towards the imaging array 16. The imaging array 16 includes an array composed of one or more of depth-sensing pixels or sensors. The imaging array 16 is configured to receive at least some of the reflected modulated signal 72 reflected back from subject 12. Each pixel of the imaging array 16 is configured to present an output signal dependent on distance from the ToF camera 10 to the locus of object 12 imaged onto that pixel. Such distance is referred to herein as "depth." The imaging array 16 is communicatively attached to a signal sampling module or a sampler 62. The sampler 62 maybe, for example, a digital signal processing module that generates sampled signal based on the output signal generated by the imaging array 16. Such sampled digital signal is communicated to the controller 18.

An implementation of the controller 18 includes logic to provide modulated drive signals to light source 14 and to imaging array 16, and to synchronize the operation of these components. In particular, the controller 18 modulates emission from the light source 14 while simultaneously modulating the array 16 (vide infra). The controller 18 is also configured to read the output signal from each pixel of the imaging array 16 as generated by the sampler 62 to enable computation of a depth map of the object 12. In one implementation, the sensor and illumination modulation is at the same frequency and a series of temporally sequential measurements are made while varying the phase relationship between the sensor (18) and illuminator (14) modulation signals. This enables the calculation of phase, albeit in other implementations other phase detection methods may be utilized.

In some implementations, the sensor itself (16) may not be modulated, instead another modulated optical element—such as a modulated image intensifier—may be placed in the imaging path between the sensor and the imaging lens (74). In some implementations ToF camera 10 may be replaced by any amplitude modulated continuous wave range imager known to those skilled in the art.

The controller 18 is configured to modulate the emission from the light source 14 with M frequencies. An implementation of the controller 18 also provides logic or programs for analyzing the sampled signals from the sampler 62 to unwrap M frequencies. In some implementations, the fully factorized ratios between the modulation frequencies may be coprime. The functioning of the controller 18 to unwrap the M frequencies is described below using parameter definitions as provided below in Table I below.

TABLE I (Parameter Definition)

| Parameter | Description |
| --- | --- |
| M | Number of frequencies |
| C | Speed of light |
| $\begin{bmatrix} f_1 \\ f_2 \\ \vdots \\ f_M \end{bmatrix}$ | Frequencies |
| $\begin{bmatrix} m_1 \\ m_2 \\ \vdots \\ m_M \end{bmatrix}$ | Frequency Ratios |
| $\begin{bmatrix} \theta_1 \\ \theta_2 \\ \vdots \\ \theta_M \end{bmatrix}$ | Input phase vector (radians) |
| $\begin{bmatrix} n_1 \\ n_2 \\ \vdots \\ n_M \end{bmatrix} \in \mathbb{Z}^M$ | Range disambiguation vector |
| $f_0$ | Base frequency corresponding to unwrapping distance |
| $T_{null} \in \mathbb{R}^{M-1 \times M}$ | Dimensionality reducing transformation |
| $T_{deskew} \in \mathbb{R}^{M-1 \times M-1}$ | Deskew/scaling matrix that maps dimensionality reduced space to a unity spaced square lattice. |
| $T = T_{deskew} T_{null}$ | Combined transformation matrix |
| B | Set of all unique, correct dealiasing tuples |
| $g_i$ | ith skew basis vector |
| $\begin{bmatrix} \hat{n}_1 \\ \hat{n}_2 \\ \vdots \\ \hat{n}_M \end{bmatrix} \in \mathbb{Z}^M$ | Range disambiguation vector for a particular distance in the noiseless case |
| $C_{deskew}$ | Set of transformed (by T_deskew) range disambiguation vectors |
| $L_{big}: \mathbb{Z}^{M-1} \to \mathbb{Z}^M$ | M-1 dimensional lookup table (LUT) |
| v | Transformed (by T) phase values |
| r | Rounded transformed phase values |
| index | Index into one-dimensional LUT implementation |
| $r_{min}$ | The minimum valid value of r for each dimension (restricted to valid disambiguation tuples) |
| $r_{max}$ | The maximum valid value of r for each dimension |
| $r_{scale}$ | The number of elements in each dimension |
| $r_{width}$ | The number of elements in each dimension when packed (for dimension i, consists of the product of $r_{scale_j}$ for $1 \le j < i$) |

ToF system 100 using the AMCW ToF range-imaging approach works by illuminating the object 12 with the modulated light signal 70 that is modulated at least temporally. One or more sensors of the imaging array 16 receive the reflected modulated signal 72 and correlate that waveform of the reflected modulated signal 72 with the sensor modulation. The sensors of the imaging array 16 convert the correlated reflected modulated signal 72 into an analog electrical signal, which are converted by the sampler 62 into a sampled signal 50. The amplitude and phase of such sampled sampled signal 50 are based on the amplitude and the phase of the modulated signal 72.

The controller 18 may include a range determination module 60 that measures the range 80 of the object 12 from the ToF camera 10. The controller 18 may also include a frequency upwrapping module 66 to perform one or more of operations for determination of the unwrapping tuple corresponding to tuple of phase measurements. As the modulated light signal 70 travels to the object 12 and back to the sampling array 16, a phase delay is introduced into the reflected modulated signal 72, which is proportional to the distance between the object 12 and the ToF camera 10. If the modulated light signal 70 is approximated as a sinusoid, the range for a given frequency of the modulated light signal 70 can be provided as:

$$\text{range} = \frac{C}{4\pi f_i}(\theta_i + 2\pi n_i)$$

Where (1) C is the speed of light, (2) $\theta_i \in [0, 2\pi)$ is the phase delay detected by a sensor of the range-imager in a measurement at temporal frequency $f_i$, and (3) $n_i \in \mathbb{Z}^+$ is an unwrapping constant that corrects for the cyclic ambiguity present in the phase of a sinusoid (note that a phase $\theta_i$ is indistinguishable from a phase $\theta_i + 2\pi$, $\theta_i + 4\pi$, etc.). For example, in the illustrated example, if the modulated light signal 70 has a frequency of $f_1$, for $n_1 = 2$, the range 80 to the object 12 may be given by the unwrapped phase as:

$$\text{range} = \frac{C}{4\pi f_1}(\theta_2 + 2\pi * 2)$$

The range determination module 60 determines $n_1$ by making measurements at multiple different frequencies $f_1, f_2, \ldots f_M$ and simultaneously solving for $n_1, n_2, \ldots n_M$. In an infinite (unrealistic) signal to noise ratio (SNR) case, the mathematical relationship could be written as:

$$\frac{C}{4\pi f_1}(\theta_1 + 2\pi n_1) = \frac{C}{4\pi f_2}(\theta_2 + 2\pi n_2) = \ldots \frac{C}{4\pi f_M}(\theta_M + 2\pi n_M)$$

This is not a practical implementation due to noise. Even in the noiseless case, this would not fully disambiguate the range 80, leaving a residual cyclic ambiguity. However, the range 80 is sufficiently disambiguated that practical implementations of the ToF system 100 can typically assume that the true range 80 always falls into the first ambiguity interval.

The measurements by the ToF system 100 are subject to noise, as a result, the range determination module 60 may calculate the range 80 given known $n_1, n_2, \ldots n_M$, as a weighted average of range estimates for each frequency, as given below:

$$\text{range} = \frac{C}{4\pi f_0}\sum_i \omega_i \frac{\theta_i + 2\pi n_i}{m_i}$$

Where the weights, $\omega_i$, are constrained such that $\Sigma_i \omega_i = 1$.

An implementation of the range determination module 60 reduces the computational complexity by reduction of the dimensionality of the input by the range determination module 60. Specifically, the range determination module 60 transforms M phases $\theta_1, \theta_2, \ldots \theta_M$ into an M−1 dimensional space that is not longer a continuous function of the range 80. Such transformation relies on the relationship:

$$\begin{bmatrix} \theta_1 \\ \theta_2 \\ \ldots \\ \theta_M \end{bmatrix} = \text{range} \times \frac{4\pi f_0}{C}\begin{bmatrix} m_1 \\ m_2 \\ \ldots \\ m_M \end{bmatrix} - 2\pi \begin{bmatrix} n_1 \\ n_2 \\ \ldots \\ n_M \end{bmatrix} + \text{noise}$$

Figure 2:
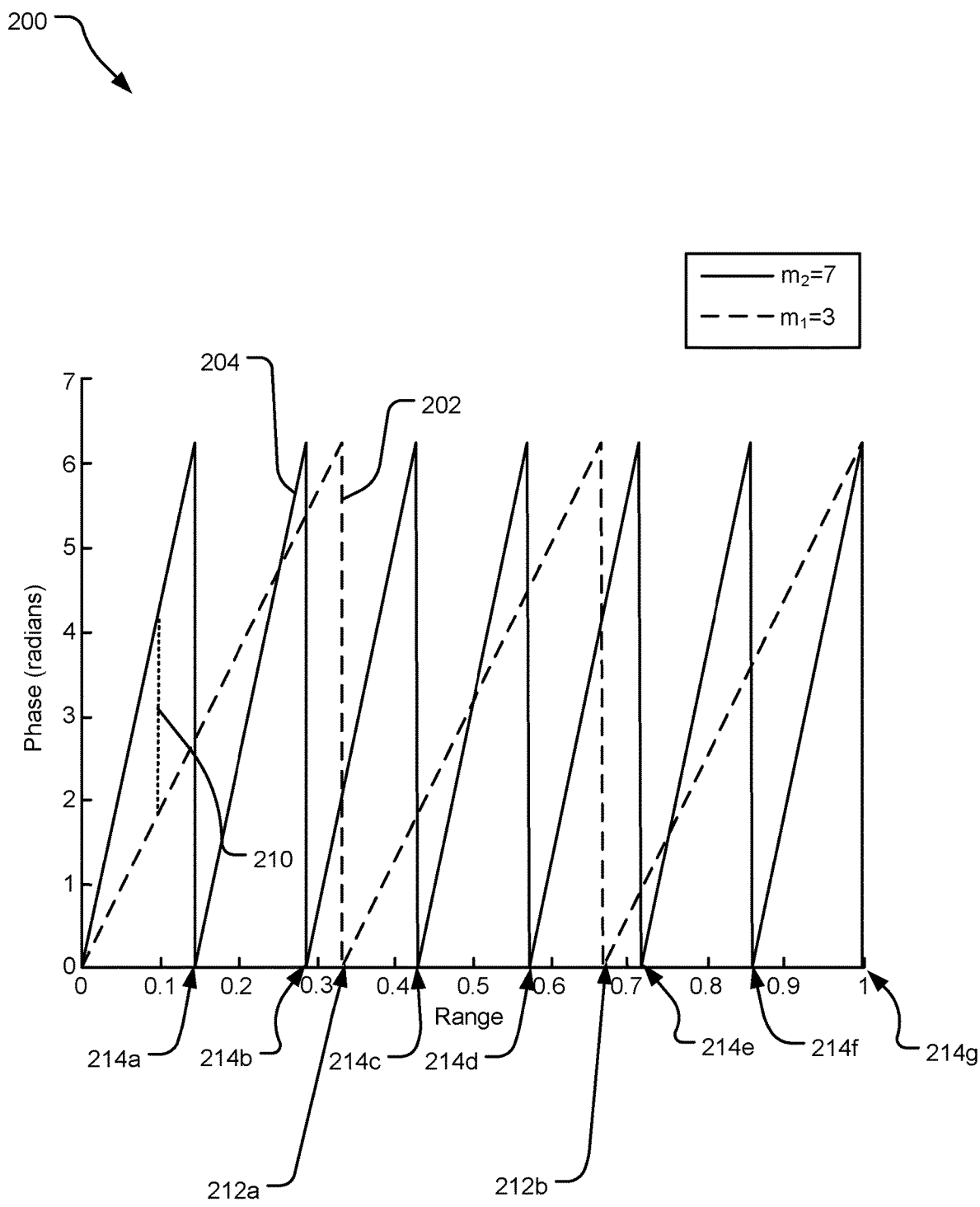
FIG. 2 illustrates an example graph of a relation between phase and range in a ToF system disclosed herein.

Specifically, the range determination module 60 decomposes each of the M phases $\theta_1, \theta_2, \ldots \theta_M$ into a a continuously range-variant term (the first term of the right hand side (RHS) of the relationship above) and a discontinuously range-variant term (the second term of the RHS of the relationship above). FIG. 2 illustrates such decomposition phases where $m_1 = 3$ and $m_2 = 7$ visually by a graph 200.

Specifically, FIG. 2 illustrates the graph 200 of phase vs. range for each of two frequencies. Specifically, line 202 represents the phase for the signal corresponding to a frequency $f_1$, where $m_1 = 3$ and line 204 represents the phase for signal at frequency $f_2$ where $m_2 = 7$. It can be seen that each of the two lines wraps at $2\pi$. Specifically, for line 202 ($m_1 = 3$), the range wraps at 212, whereas for phase 204 ($m_2 = 7$), the range wraps at 214. This relation represented by the graph 200 can also be disclosed alternatively by a plot of $\theta_1$ against $\theta_2$ in two dimensions. For example, as seen in graph 200, both phases 202 and 204 start with zero difference between them at the origin. However, as the phase 202 increases faster than the phase 204, at range 0.1, the distance between the phase 202 and 204 is 210. As seen, the distance 210 increases until phase 202 reaches $2\pi$ at 214*a*.

Figure 3:
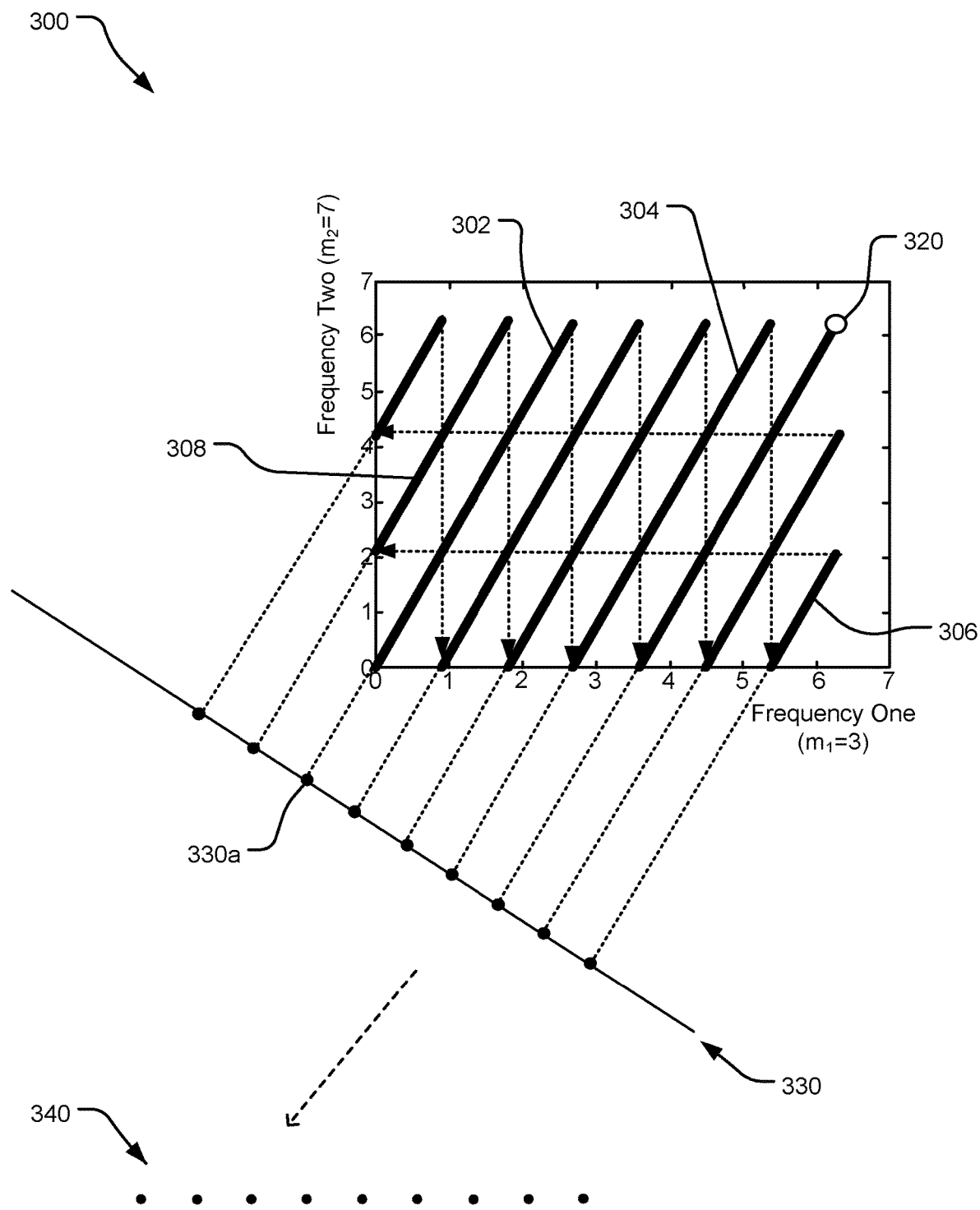
FIG. 3 illustrates an example graph of a relation between two phases in a ToF system disclosed herein.

FIG. 3 illustrates a graph 300 for this relation between two phase measurements $\theta_1$ and $\theta_2$. Specifically, line 302 illustrates the relation between the phases of measurements at frequencies $f_1$, $f_2$ corresponding to lines 202 and 204, from origin until 214*a*. At this point the relation moves to line 304, then to line 306, then to line 308, etc. As seen in FIG. 3, each of these lines 302, 304, 306, etc., are isolated from each other. Each of the transitions between the lines 302, 304, 306, etc., are shown by the dotted lines in graph 300.

The identity of each of the lines 302, 304, 306, etc., encodes a range disambiguation tuple $(n_1, n_2, \ldots n_M)$, that allows the calculation of disambiguated phase for any of the measurement frequencies plot. This allows the range determination module 60 to disambiguate range measurements out to $$\text{range} = \frac{C}{2f_0}$$

if there is no factor common to all the relative frequencies $m_1, m_2, \ldots m_M$. The range determination module 60 may further encode the identity of each of the lines 302, 304, 306, etc., by mapping onto a vector subspace that is the orthogonal complement of the vector $(m_1, m_2, \ldots m_M)$. In the case of two frequencies, this may correspond to projecting onto a basis vector orthogonal to $(m_1, m_2)$, giving a series of points referred to as 'unwrapping points' that can be uniquely identified by single coefficient corresponding to the distance along a line. This is shown by the line 330 which represents such a basis vector (for illustrative purposes it does not go through the origin). For example, the identity of the line 302 is represented by point 330*a* along the line 330.

Thus, the range determination module 60 reduces the dimensionality by one (1) from two dimension as per graph 300 to one dimension of line 330. The one dimension of the basis vector is more clearly illustrated by 340.

The range determination module 60 is also configured to achieve such reduction in dimensionality for higher dimensions, such as from M to M−1, 5 to 4, . . . , 2 to 1, etc. Such reduction of dimensionality results in the removal of any continuous range dependency from the reduced dimensionality vector.

Figure 4:
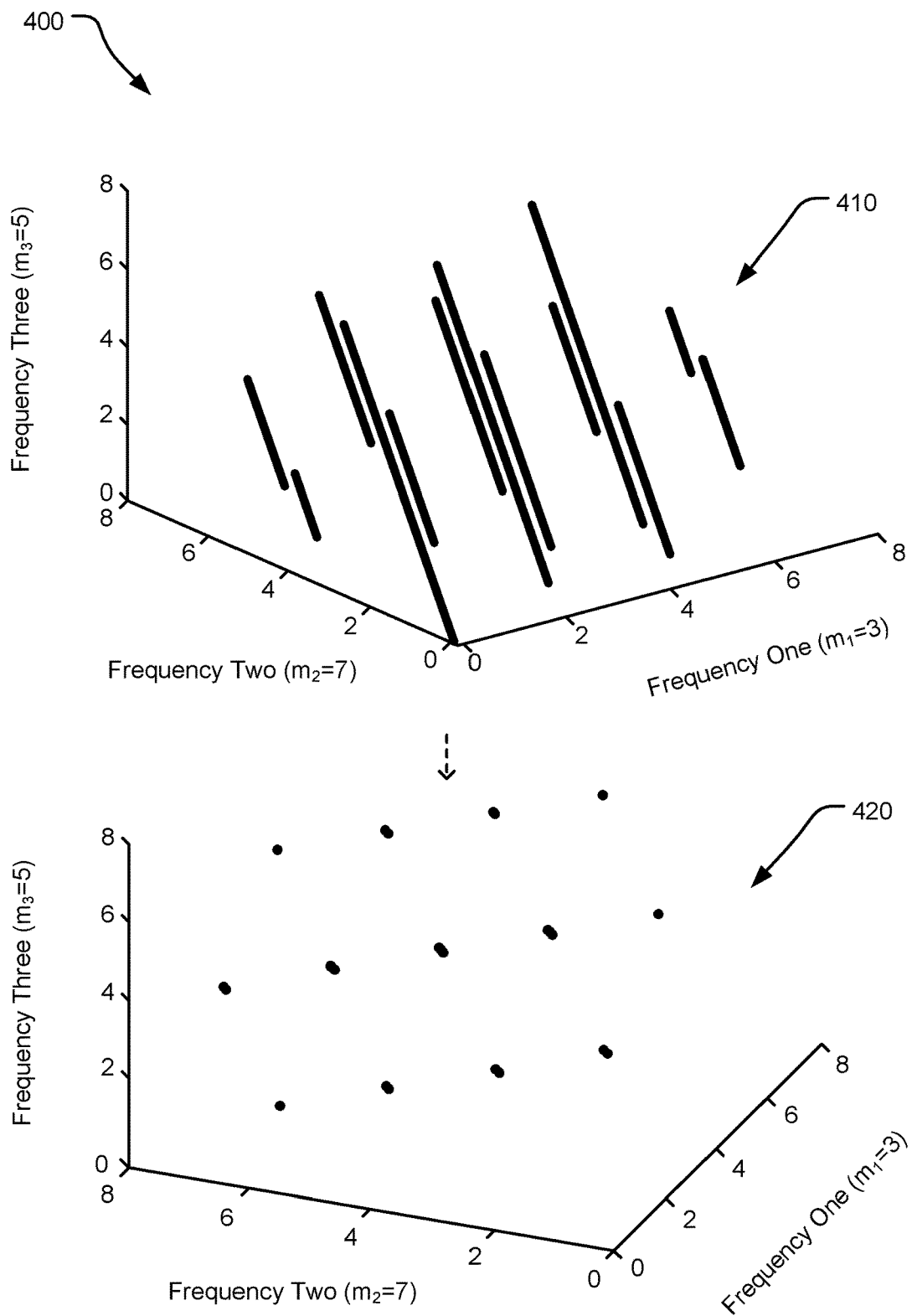
FIG. 4 illustrates an example graph showing reduction in dimensionality accomplished by a ToF system disclosed herein.

FIG. 4 illustrates an example graph 400 showing such reduction in dimensionality accomplished by the range determination module 60 for three frequencies (M=3) Specifically, a graph 410 illustrates relationship between measured phases $\theta_1, \theta_2, \ldots \theta_M$, where each line corresponds to a unique range disambiguation tuple $(n_1, n_2, \ldots n_M)$ or 'unwrapping point'. The reduction in dimensionality from M=3 to M=2 results in the graph 420, which consists of a skewed and scaled lattice of unwrapping points in two dimensions. The range determination module 60 is further configured to achieve such reduction in dimensionality to any number of dimensions. Thus given that the points in M−1 dimensional space are merely a skewed and scaled lattice, the range determination module 60 identifies the correct unwrapping point without performing any search at run-time. This enables a substantial reduction in computation over all previous methods reliant upon repetitive calculation of a cost function giving computational complexity bounded solely by the number of frequencies.

Figure 5:
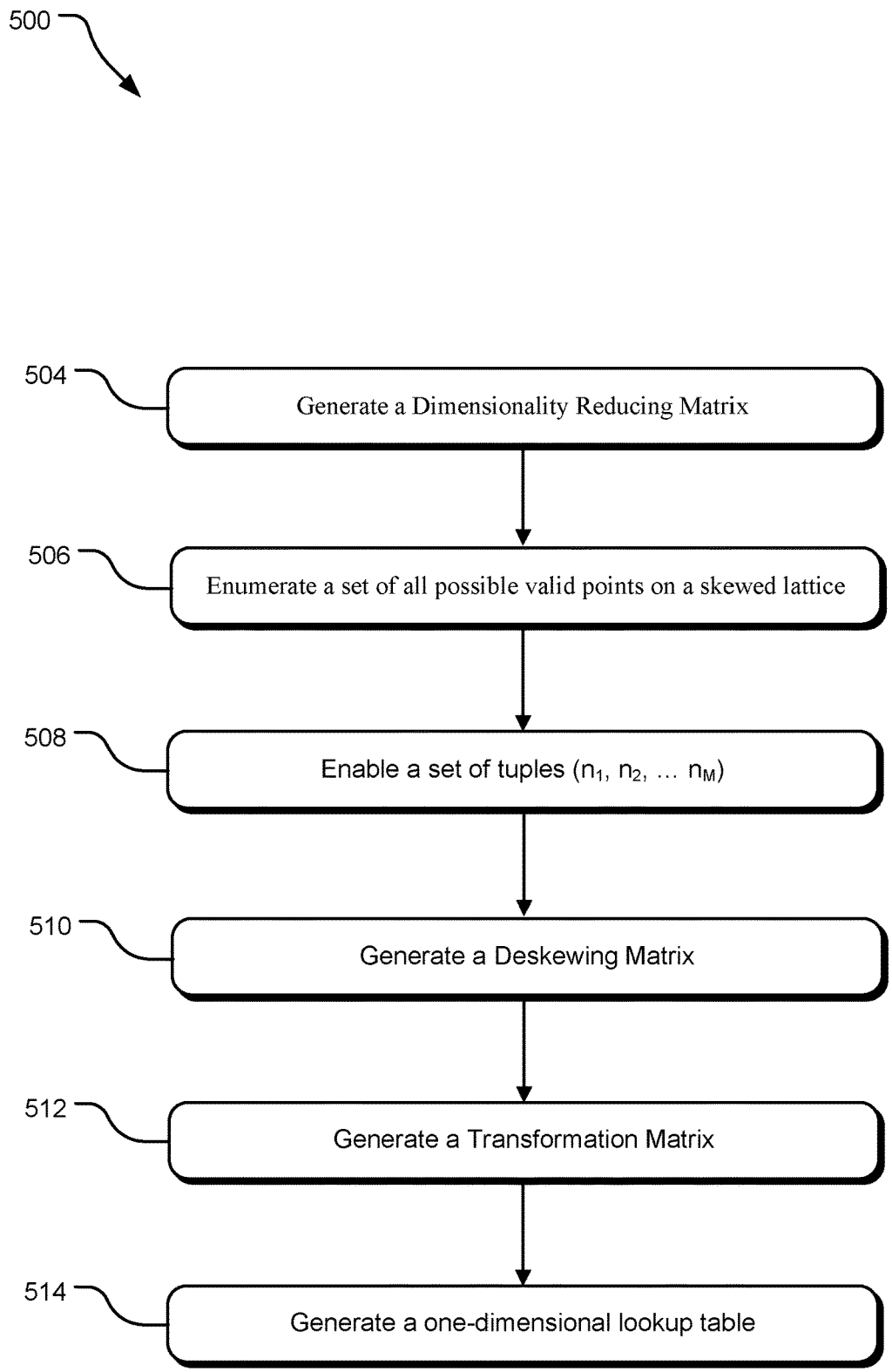
FIG. 5 illustrates an example workflow of operations for generating a transformation matrix used by the ToF system disclosed herein.

FIG. 5 illustrates an example workflow 500 of operations for generating a transformation matrix (T). Specifically, such transformation is formed as the product of two matrices, $T_{deskew} \in \mathbb{R}^{M-1 \times M-1}$ and $T_{null} \in \mathbb{R}^{M-1 \times M}$, where $$\text{kernel}(T_{null}) = (m_1, m_2, \ldots m_M)$$

An operation 504 generates a dimensionality reducing matrix $T_{null}$. In one implementation, $T_{null}$ is calculated by Gram-Schmidt orthogonalization of a matrix of the form $$\begin{bmatrix} m_2 & -m_1 & 0 & \ldots & 0 \\ m_3 & 0 & -m_1 & \ldots & 0 \\ \vdots & \vdots & \vdots & \ddots & \vdots \\ m_M & 0 & 0 & \ldots & -m_1 \end{bmatrix}$$

In other implementations, other matrix transformations that have the same kernel as specified above, may be utilized. The dimensionality reducing matrix $T_{null}$ includes a a plurality of basis vectors orthogonal to a frequency ratio vector $(m_1, m_2, \ldots m_M)$.

An operation 506 explicitly enumerates a set of all possible valid points on the skewed lattice. For example, for a system using three unwrapping frequencies with ratios $(m_1, m_2, m_3)$, when one of the frequencies wraps from $2\pi$ back to a phase of zero, the operation 506 transitions to a different line in three-dimensional space of phases. This results in a transition to a different unwrapping point in the reduced dimensionality space (or correspondingly, a different line in the full dimensional space). In some implementations only a subset of these points may be enumerated, or additional atypical points included.

An operation 508 enumerates a set of tuples composing a function, $B: \mathbb{R}^{M-1} \to \mathbb{Z}^M$ mapping from transformed phase tuples $(q_1, q_2, \ldots q_M) = T_{null}(\theta_1, \theta_2, \ldots \theta_M)$ to unwrapping tuples $(n_1, n_2, \ldots n_M)$, which may include both valid and invalid tuples depending on the implementation.

In one implementation, the operation 508 may enumerate such set of tuples by finding all wrapping points with special handling at the points where more than one frequency wraps at the same time in order to deal with noise. The special handling is because although frequency j and frequency k may have phases that theoretically wrap at the same time, a little bit of noise means that one value may have wrapped while the other has not, giving what we typically term 'virtual points'. These are virtual in that they shouldn't exist in the noiseless case, but they do in reality, and any system that does not take them into account may have a noise magnifying effect at these multiple-frequency wrapping points. If N frequencies wrap at the same distance, then $2^N$ possible valid unwrapping tuples correspond to the correct unwrapping tuples for infinitesimal perturbations in the phase vector $(\theta_1, \theta_2, \ldots \theta_M)$.

In an example implementation with $(m_1, m_2, m_3) = (15, 10, 2)$, there are three points at which multiple frequencies wrap at the same time. These are at $$\frac{2\pi}{3}, \pi \text{ and } \frac{4\pi}{3}$$

(corresponding to frequencies one and two wrapping at the same time, frequencies one and three wrapping at the same time and frequencies one and two wrapping at the same time, respectively). As an example, the first multiple frequency wrapping point at $$\frac{2\pi}{3}$$

(notated as it a phase at base frequency $f_0$) corresponds to the following element in B $$\left((p_1, p_2, p_3), (n_1, n_2, n_3) = \left(T_{null}\left(\text{mod}\left(\frac{2\pi}{3}(15, 10, 12), 2\pi\right) + 2\pi(0, 0, 0)\right), (3, 2, 0)\right)\right)$$

and to the following virtual points.

$$((p_1, p_2, p_3), (n_1, n_2, n_3)) = \left(T_{null}\left(\text{mod}\left(\frac{2\pi}{3}(15, 10, 2), 2\pi\right) + 2\pi(1, 0, 0)\right), (2, 2, 0)\right)$$

$$((p_1, p_2, p_3), (n_1, n_2, n_3) = \left(T_{null}\left(\text{mod}\left(\frac{2\pi}{3}(15, 10, 2), 2\pi\right) + 2\pi(0, 1, 0)\right), (3, 1, 0)\right)$$

$$((p_1, p_2, p_3), (n_1, n_2, n_3)) = \left(T_{null}\left(\text{mod}\left(\frac{2\pi}{3}(15, 10, 2), 2\pi\right) + 2\pi(1, 0, 0)\right), (2, 1, 0)\right)$$

However, some of these points may be optionally excluded based upon noise criteria and many of these points may be generated multiple times and resolved in to a set of unique points at some stage in the processing.

One particular implementation of the operation 508 is provided by the algorithm below:

---

A = initially empty set of (distance, j) tuples
$B_u$ = initially empty set of (($\theta_1, \theta_2, \ldots \theta_m$), ($n_1, n_2, \ldots n_M$)) tuples that define a mapping from a vector of phase measurements to the corresponding unwrapping vector.
// Build up list of transition points
For all $f_j \in \{f_1, f_2, \ldots f_M\}$, where j is the frequency number
    For all integer $0 \leq k \leq m_j$ $$\text{Calculate range at unwrapping point, distance} = \frac{C}{2f_0} \times \frac{k}{m}$$

Add (distance, j) tuple to set A
    End loop
End loop
// Find duplicate transition points
For all tuples (distance, k) $\in$ A // (k is not used)
    Calculate the corresponding ideal, noiseless unwrapping tuple as
$(\hat{n}_1, \hat{n}_2, \ldots \hat{n}_M) =$ $$\left(\text{floor}\left(\frac{2f_0 m_1 \text{distance}}{C}\right), \text{floor}\left(\frac{2f_0 m_2 \text{distance}}{C}\right), \ldots \text{floor}\left(\frac{2f_0 m_M \text{distance}}{C}\right)\right)$$

$(\hat{\theta}_1, \hat{\theta}_2, \ldots \hat{\theta}_M) =$ $$\left(\text{mod}\left(\frac{4\pi f_0 m_1 \text{distance}}{C}, 2\pi\right), \text{mod}\left(\frac{4\pi f_0 m_2 \text{distance}}{C}, 2\pi\right), \ldots \text{mod}\left(\frac{4\pi f_0 m_M \text{distance}}{C}, 2\pi\right)\right)$$

Set $J = \{((\hat{\theta}_1, \hat{\theta}_2, \ldots \hat{\theta}_M), (\hat{n}_1, \hat{n}_2, \ldots \hat{n}_M))\}$
// Generate all $2^N$ possible disambiguation tuples (each iteration doubles the number of variants, by handling phase wrapping for a particular frequency which wraps at the current distance)
    For all j, such that (d, j) $\in$ A $\wedge$ d = distance
        Update the values in set J such that $J_{new} = J_{old} \cup \{((\hat{\theta}_1 + 2\pi x_1, \hat{\theta}_2 + 2\pi x_2, \ldots \hat{\theta}_M + 2\pi x_M),$
$(\hat{n}_1 - x_1, \hat{n}_2 - x_2, \ldots \hat{n}_M - x_M))|(t \neq j \Rightarrow x_t = 0) \wedge (t = j \Rightarrow x_t = 1) \wedge ((\hat{\theta}_1, \hat{\theta}_2, \ldots \hat{\theta}_M),$
$(\hat{n}_1, \hat{n}_2, \ldots \hat{n}_M)) \in J_{old}\}$. This corresponds to adding $2\pi$ to the specific frequency's phase and subtracting one from the disambiguation constant.
    End loop
All all the elements of set J to set $B_u$ and throw out the contents of J
End loop
Remove duplicate tuples from $B_u$.
Create a new set B, mapping from transformed (reduced dimensionality) phase to the unwrapping tuple/vector, by applying $T_{null}$ to the domain values in $B_u$ i.e.
$B = \{(T_{null}(\hat{\theta}_1, \hat{\theta}_2, \ldots \hat{\theta}_M), (\hat{n}_1, \hat{n}_2, \ldots \hat{n}_M))|((\hat{\theta}_1, \hat{\theta}_2, \ldots \hat{\theta}_M), (\hat{n}_1, \hat{n}_2, \ldots \hat{n}_M)) \in B_u\}$

---

Once the mapping B has been determined, an operation 510 generates a deskewing matrix $T_{deskew}$. Specifically, the operation 510 may generate the deskewing matrix $T_{deskew}$ as the matrix that maps a skewed lattice corresponding to domain(B) onto a unity square lattice. In one implementation, the deskewing matrix $T_{deskew}$ is generated as:

$$T_{deskew} = (g_1 g_2 \ldots g_{M-1})^{-1}$$

Where $g_j \in \mathbb{R}^{M-1 \times 1}$ are basis vectors, such that $g_j \in$ domain (B). $g_1$ is constrained such that there is no vector in domain (B) that has a smaller norm, as indicated below:

$$\forall_{q \in domain(B)} \|g_1\| \leq \|q\|$$

Which is determined, for example, by a brute-force search over domain(B). $g_j$ for j>1 is determined by finding the vector with the smallest Euclidian norm that is linearly independent of all previous vectors $g_1, g_2, \ldots g_j - 1$. This can be expressed mathematically by $$g_j \notin \text{span}(\{g_1, g_2, \ldots g_{j-1}\}) \wedge \forall_{q \in domain(B)}(q \in \text{span}(\{g_1, g_2, \ldots g_{j-1}\}) \Longrightarrow \|g_j\| \leq \|q\|)$$

In some embodiments, $T_{deskew}$ may be an identity matrix as $T_{null}$ already maps directly onto a unity square lattice.

An operation 512 generates the transformation matrix (T) by combining the dimensionality reducing matrix ($T_{null}$) and the deskewing matrix $T_{deskew}$. For example, in one implementation, the operation 512 generates the transformation matrix (T) by generating a product of the dimensionality reducing matrix ($T_{null}$) and the deskewing matrix $T_{deskew}$. Thus, the frequency unwrapping module 66 may generate the transformation matrix (T) based upon frequency ratios ($m_1, m_2 \ldots m_M$) of the modulation frequencies. In one implementation, the operation 512 may generate the transformation matrix (T) such that the transformation matrix (T) maps a noiseless phase vector onto an integer lattice. In one implementation, the transformation matrix (T) reduces the dimensionality of the input phase vector from M to (M−1) dimensions.

An operation 514 generates a one dimensional LUT by packing the M−1 dimensional domain of B into one dimension using $T_{deskew}$ and additional transformations. In other words, the operation 514 generates the one dimensional lookup table using the transformation matrix (T) and packing M−1 dimensions into one dimension. The one-dimensional LUT may provide a number of range disambiguations. An example of a one-dimensional LUT is disclosed further below in FIG. 8. The one-dimensional LUT maps to the phase unwrapping vector ($n_1, n_2, \ldots n_M$). The generation of the one-dimensional LUT is disclosed in further detail below in FIG. 7.

Figure 6:
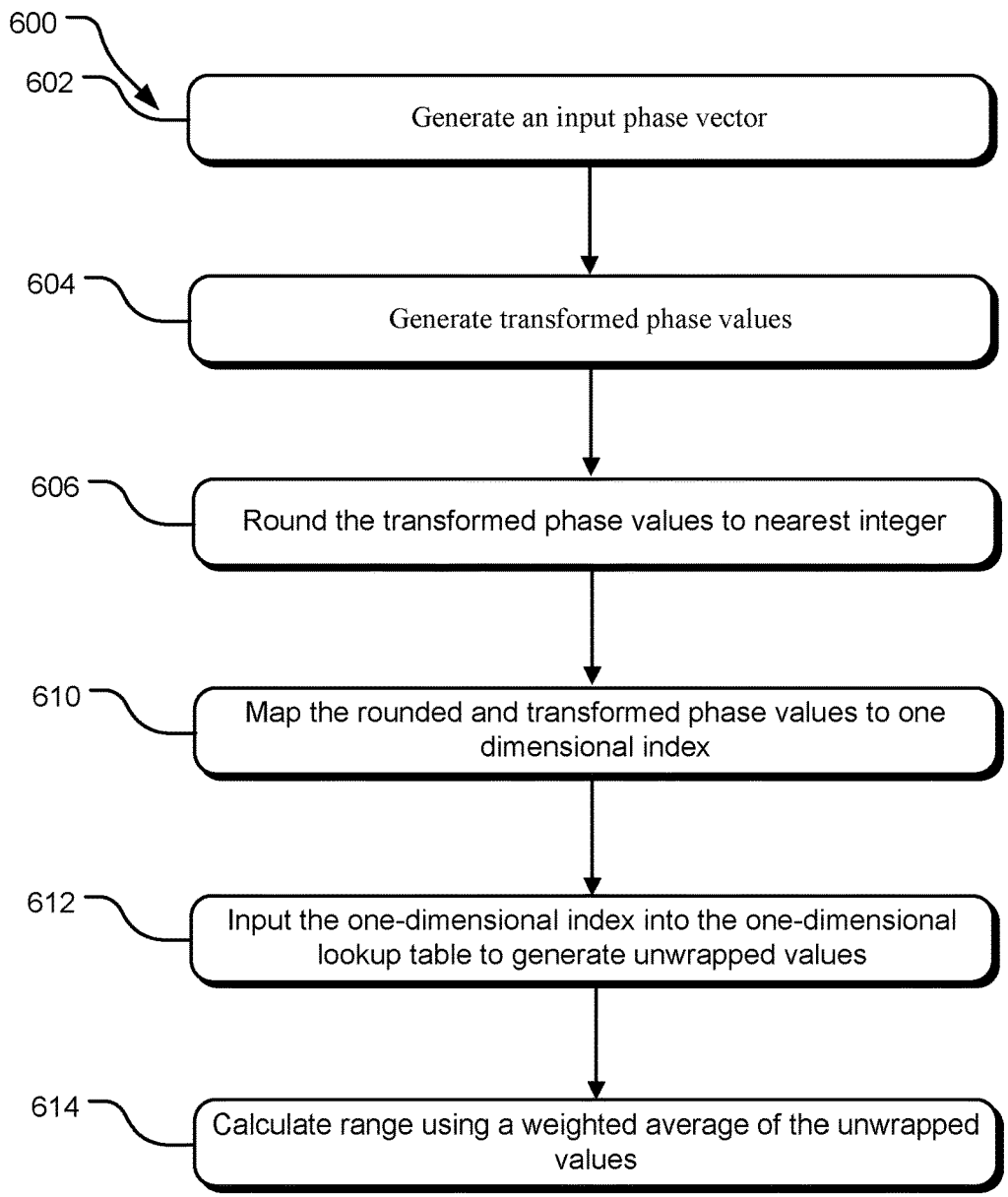
FIG. 6 illustrates operations for determination of a correct unwrapping tuple.

FIG. 6 illustrates operations 600 for determination of the unwrapping tuple corresponding to tuple of phase measurements. Specifically, the operations 600 allow for fast determination of the correct unwrapping tuple without any brute-force searching, which is computationally efficient. One or more of the operations 600 may be implemented by the frequency upwrapping module 66.

An operation 602 generates an input phase vector of measured phase values ($\theta_1, \theta_2, \ldots \theta_M$). An operation 604 takes measured phase values ($\theta_1, \theta_2, \ldots \theta_M$) and generates transformed phase values using the transformation matrix, $v=T(\theta_1, \theta_2, \ldots \theta_M)$. The transformed phase values are rounded to the nearest integer by an operation 606 to generate rounded transformed phase values r=round (v).

An operation 610 maps the rounded and transformed phase values r=round (v) to a one dimensional index. In one implementation this is achieved by the following transformation:

$$\text{index} = (r - r_{min}) \cdot r_{width}$$

Where $r_{min}$ is a vector of the smallest valid values of each element $v_i$ i.e.

$$r_{min} = \begin{bmatrix} r_{min,1} \\ r_{min,2} \\ \vdots \\ r_{min,M-1} \end{bmatrix}$$

$$\forall_{1 \leq i \leq M-1} ((\forall_{(v_1, v_2, \ldots v_{M-1}) \in C_{deskew}} r_{min,i} \leq v_i) \wedge$$

$$(\exists_{(v_1, v_2, \ldots v_{M-1}) \in C_{deskew}} r_{min,i} = v_i))$$

Where $C_{deskew}$ is the domain of B transformed by the deskew matrix $T_{deskew}$.

And $r_{width}$ is a vector denoting the number of single dimensional elements per transformed phase unit for each dimension, i.e.

$$r_{width} = (1, r_{scale,1}, r_{scale,1} \cdot r_{scale,2}, \ldots r_{scale,1} \cdot r_{scale,2} \cdots r_{scale,M-1})$$

Where $$r_{scale} = \begin{bmatrix} r_{scale,1} \\ r_{scale,2} \\ \vdots \\ r_{scale,M-1} \end{bmatrix} = \begin{bmatrix} r_{max,1} - r_{min,1} \\ r_{max,2} - r_{min,2} \\ \vdots \\ r_{max,M-1} - r_{min,M-1} \end{bmatrix} + 1$$

And $r_{max}$ is a vector of the largest valid values of each element $v_i$, $$r_{max} = \begin{bmatrix} r_{max,1} \\ r_{max,2} \\ \vdots \\ r_{max,M-1} \end{bmatrix}$$

$$\forall_{1 \leq i \leq M-1} ((\forall_{(v_1, v_2, \ldots v_{M-1}) \in C_{deskew}} r_{max,i} \geq v_i) \wedge$$

$$(\exists_{(v_1, v_2, \ldots v_{M-1}) \in C_{deskew}} r_{max,i} = v_i))$$

An operation 612 inputs the one-dimensional index into the one-dimensional LUT to determine a range of an object as $L(\text{index}) \mapsto (n_1, n_2, \ldots n_M)$.

Once the correct disambiguation constants have been calculated, an operation 614 calculates the range by a weighted average of the unwrapped values ($n_1, n_2, \ldots n_M$) or any other appropriate method known to experts in the art.

In some implementations the aforementioned steps may be merged, either implicitly or explicitly, but are functionally equivalent.

Figure 7:
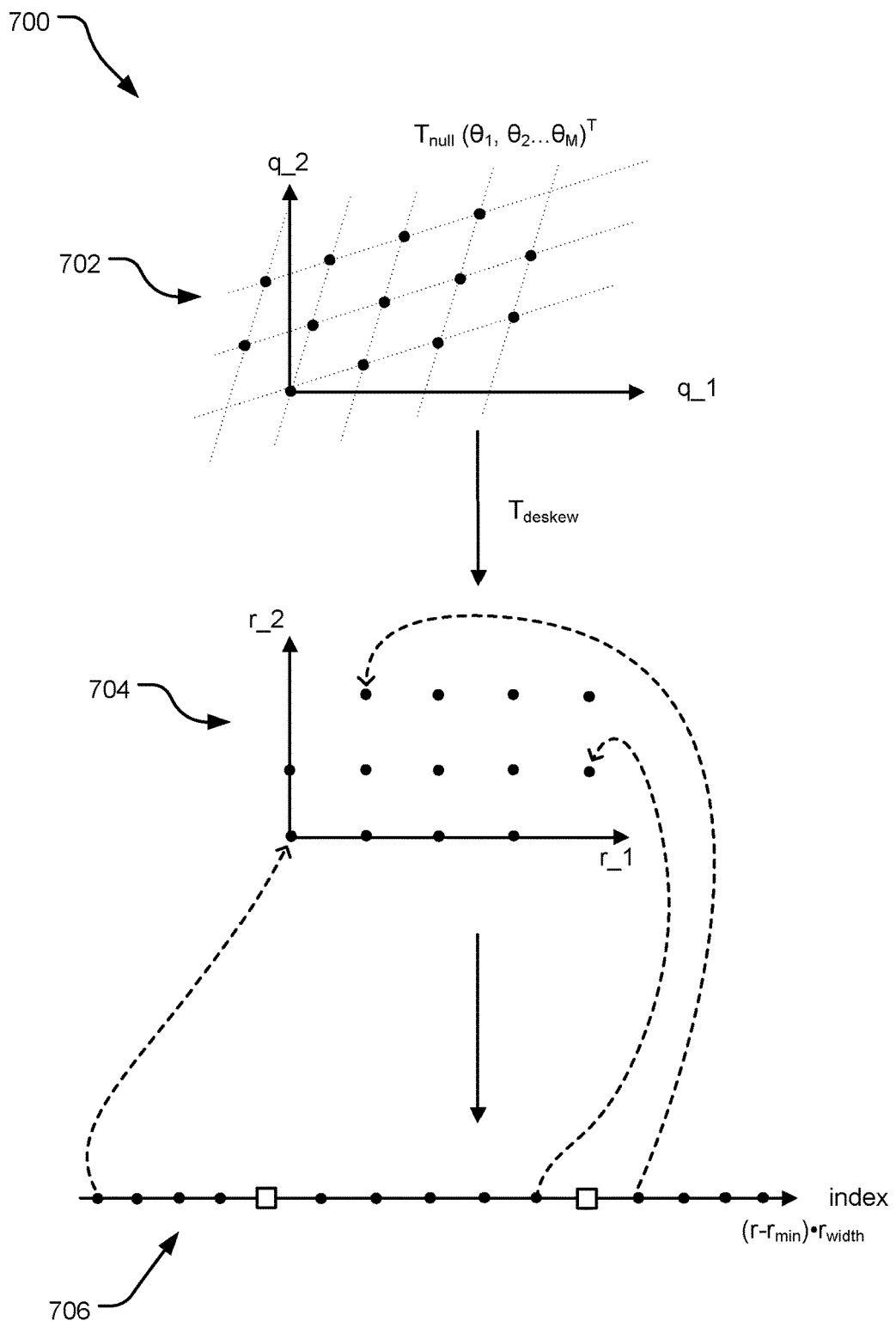
FIG. 7 illustrates an example graph showing generation of a one-dimensional lookup table (LUT).

FIG. 7 illustrates a graph 700 illustrating generation of the one-dimensional LUT. Specifically, 702 illustrates various a graph of transformed phase values ($q_1, q_2, \ldots q_M) = T_{null}(\theta_1, \theta_2, \ldots \theta_M)$. As the deskewing transformation $T_{deskew}$ is applied to the phase values, the phase values are transformed to transformed phase values as represented by graph 704. As previously explained, ($r_1, r_2, \ldots r_M) = T(\theta_1, \theta_2, \ldots \theta_M) = T_{deskew}(q_1, q_2, \ldots q_M)$, thus the axes of 704 are deskewed, transformed phase values. The deskewed transformed phase values shown at 704 are converted to a one dimensional index 706, where the index=$(r - r_{min}) \cdot r_{width}$.

Figure 8:
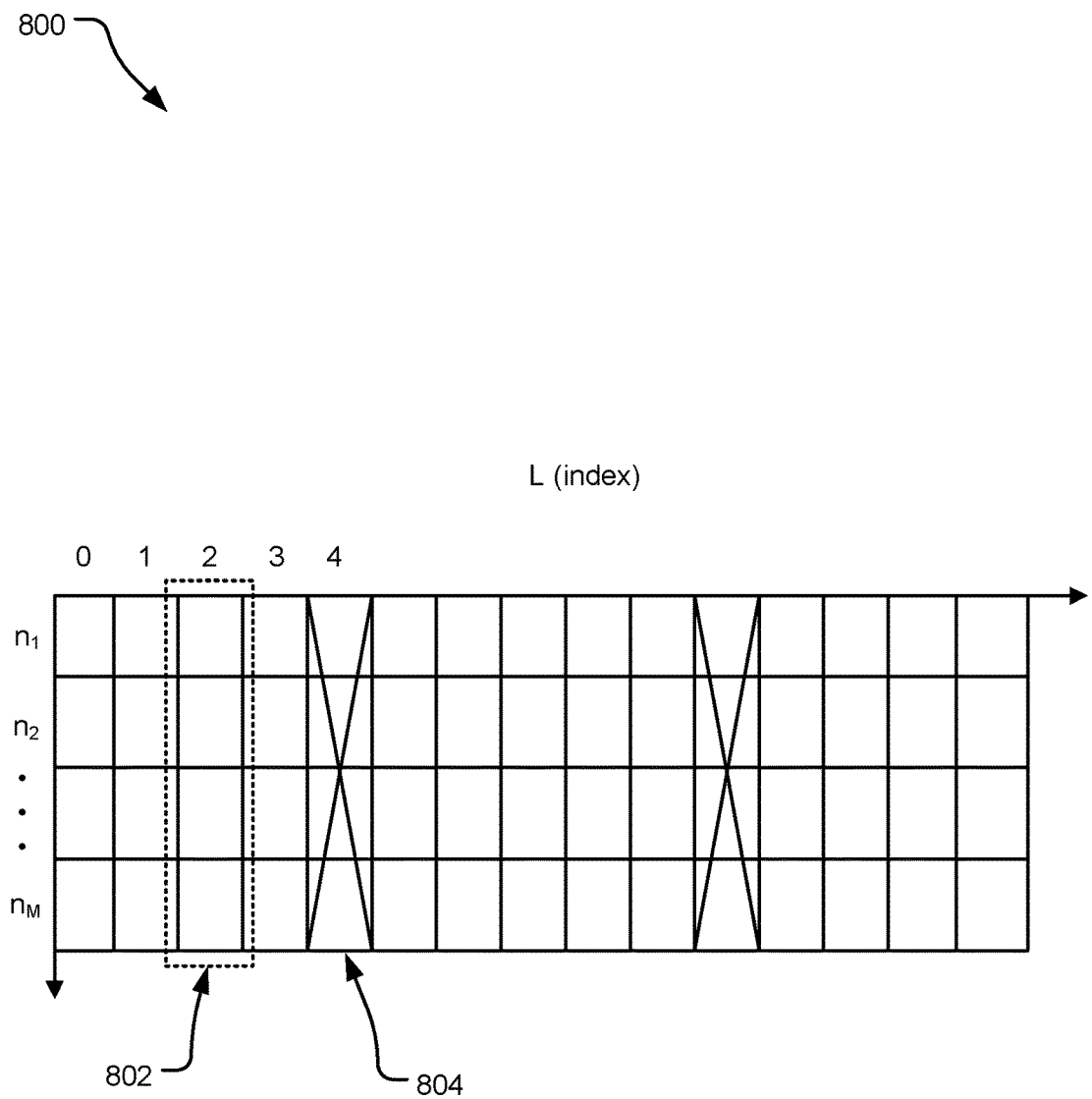
FIG. 8 illustrates an example of a one-dimensional LUT used by the ToF system disclosed herein.

FIG. 8 illustrates an example of a one-dimensional LUT 800. The one-dimensional LUT 800 provides a series of range disambiguation vectors ($n_1, n_2, \ldots n_M$) for various index values. For example, 802 represents a range disambiguation vector for index=2. For certain index values, the corresponding range disambiguation vector may be invalid or empty, such as for example, for n=4, as represented by 804.

Figure 9:
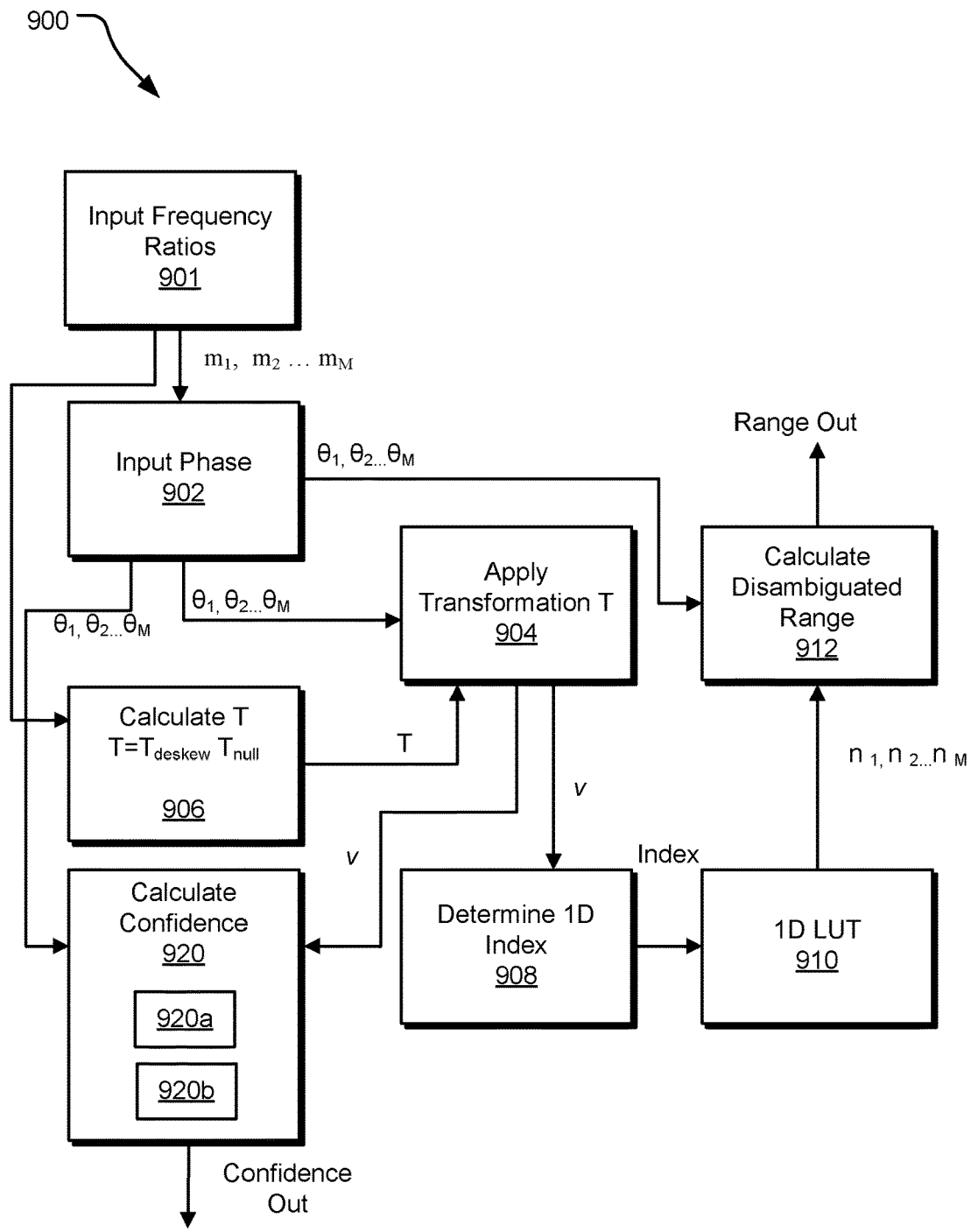
FIG. 9 illustrates an example workflow of a ToF system providing multi-frequency unwrapping.

FIG. 9 illustrates an example workflow 900 of a ToF system providing multi-frequency unwrapping. A block 901 represents input frequency ratios ($m_1, m_2 \ldots m_M$). These frequency ratios may be used to generate input phase values and to calculate a transformation matrix (T). A block 902 represents the input phase where an input phase vector including various phases ($\theta_1, \theta_2 \ldots \theta_M$) are generated by a ToF system. A transform T is applied to the phases ($\theta_1, \theta_2 \ldots \theta_M$) at a block 904. The transformed phase values, as represented by v, are input to a block 908 to determine an index value for a one-dimensional LUT. The index value may be a one dimensional index value. The block 908 generates an index value that is input to a LUT 910, which generates a range disambiguation vector ($n_1, n_2, \ldots n_M$). A block 912 calculates the disambiguated range using the range disambiguation vector ($n_1, n_2, \ldots n_M$).

A block 906 generates a transformation vector T as a product of a deskewing vector $T_{deskew}$ and a null vector $T_{null}$. The transformation vector T is input to the block 904, which applied this transformation vector T to phases ($\theta_1, \theta_2 \ldots \theta_M$). In some embodiments, this may be precomputed and stored.

A block 920 is confidence interval calculation module to calculate confidence intervals or confidence values for the measured value of the range. A block 920a calculates the confidence interval value using the phases ($\theta_1, \theta_2 \ldots \theta_M$) and the transformed phase values v. This confidence interval value infers the amount of error present in the input phase vector by comparing the consistency of phase measurements—thus is a useful value for detecting error sources, including systematic error sources, multipath error sources, etc.

In one implementation, the block 920a calculates the confidence interval as follows:

$$\text{confidence} = \|r - v\|$$

Wherein r is a vector of a rounded transformed phase values (round($T(\theta_1, \theta_2, \ldots \theta_M)$)) and v is an unrounded vector of transformed phase values ($T(\theta_1, \theta_2, \ldots \theta_M)$). Here the confidence interval indicates the Euclidian distance of the rounded transformed phase value from the unrounded value. This confidence interval value is particularly suitable for noisy or multipath data where there are multiple returns from different distances within a single measurement, making measurements at different frequencies systematically inconsistent, even at infinite signal to noise ratio.

In another implementation a block 920b calculates the square of this value, so as to avoid an additional square root operation. In another embodiment, a linear or non-linear transformation, such as a matrix transformation, is applied before calculating the norm. This norm may be any sort of norm, e.g. $\mathcal{L}_p$ norms. In yet another implementation, the function, $$\text{confidence}_2 = \sum_i \omega_i \left| \text{range} - \frac{C}{4\pi f_i}(\theta_i + 2\pi n_i) \right|^2$$

is used, which for some error weights—potentially all set to unity—encodes the sum squared error between a range corresponding to individual unwrapped phase measurements (calculated from $\theta_i + 2\pi n_i$ for the individual phase measurement denoted by i) and the final estimated range. Other norms or distance metrics may also be used and the confidence may be calculated directly on the unwrapped phase values without explicit conversion to range. In some embodiments alternative, mathematically equivalent implementations of the aforementioned confidence metrics may be used.

Figure 10:
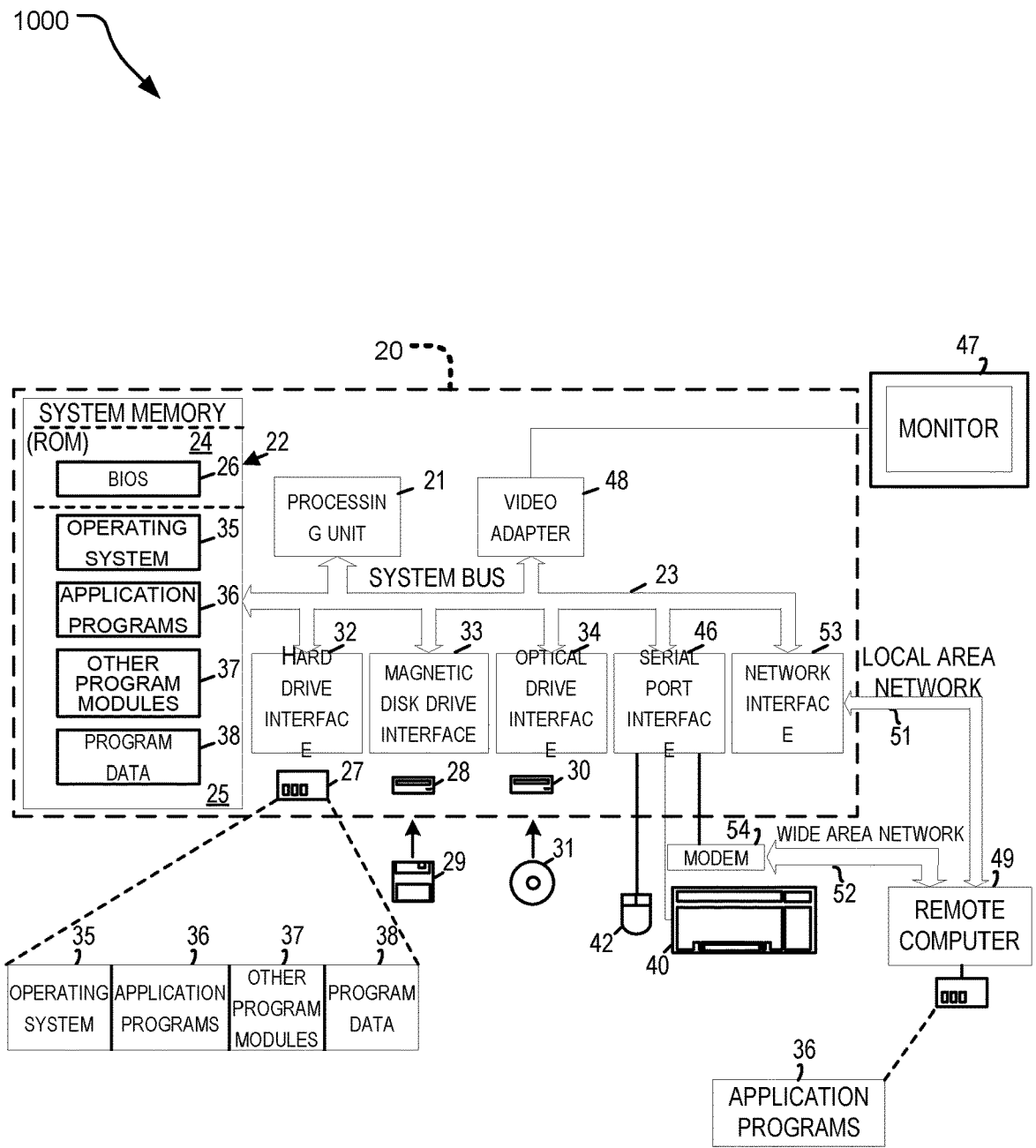
FIG. 10 illustrates an example system that may be useful in implementing the described technology.

FIG. 10 illustrates an example system 1000 that may be useful in implementing the described time-of-flight system with multi frequency unwrapping. The example hardware and operating environment of FIG. 11 for implementing the described technology includes a computing device, such as a general purpose computing device in the form of a computer 20, a mobile telephone, a personal data assistant (PDA), a tablet, smart watch, gaming remote, or other type of computing device. In the implementation of FIG. 11, for example, the computer 20 includes a processing unit 21, a system memory 22, and a system bus 23 that operatively couples various system components including the system memory to the processing unit 21. There may be only one or there may be more than one processing unit 21, such that the processor of a computer 20 comprises a single central-processing unit (CPU), or a plurality of processing units, commonly referred to as a parallel processing environment. The computer 20 may be a conventional computer, a distributed computer, or any other type of computer; the implementations are not so limited.

The system bus 23 may be any of several types of bus structures including a memory bus or memory controller, a peripheral bus, a switched fabric, point-to-point connections, and a local bus using any of a variety of bus architectures. The system memory may also be referred to as simply the memory, and includes read-only memory (ROM) 24 and random access memory (RAM) 25. A basic input/output system (BIOS) 26, containing the basic routines that help to transfer information between elements within the computer 20, such as during start-up, is stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM, DVD, or other optical media.

The computer 20 may be used to implement a signal sampling module configured to generate sampled signals based on the reflected modulated signal 72 as illustrated in FIG. 1. In one implementation, a frequency unwrapping module including instructions to unwrap frequencies based on the sampled reflected modulations signals may be stored in memory of the computer 20, such as the read-only memory (ROM) 24 and random access memory (RAM) 25, etc.

Furthermore, instructions stored on the memory of the computer 20 may be used to generate a transformation matrix using one or more operations disclosed in FIG. 5. Similarly, instructions stored on the memory of the computer 20 may also be used to implement one or more operations of FIG. 6 to determine a correct unwrapping tuple. The memory of the computer 20 may also store an LUT, such as the one dimensional LUT disclosed in FIG. 8.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated tangible computer-readable media provide nonvolatile storage of computer-readable instructions, data structures, program modules and other data for the computer 20. It should be appreciated by those skilled in the art that any type of tangible computer-readable media may be used in the example operating environment.

A number of program modules may be stored on the hard disk, magnetic disk 29, optical disk 31, ROM 24, or RAM 25, including an operating system 35, one or more application programs 36, other program modules 37, and program data 38. A user may generate reminders on the personal computer 20 through input devices such as a keyboard 40 and pointing device 42. Other input devices (not shown) may include a microphone (e.g., for voice input), a camera (e.g., for a natural user interface (NUI)), a joystick, a game pad, a satellite dish, a scanner, or the like. These and other input devices are often connected to the processing unit 21 through a serial port interface 46 that is coupled to the system bus, but may be connected by other interfaces, such as a parallel port, game port, or a universal serial bus (USB). A monitor 47 or other type of display device is also connected to the system bus 23 via an interface, such as a video adapter 48. In addition to the monitor, computers typically include other peripheral output devices (not shown), such as speakers and printers.

The computer 20 may operate in a networked environment using logical connections to one or more remote computers, such as remote computer 49. These logical connections are achieved by a communication device coupled to or a part of the computer 20; the implementations are not limited to a particular type of communications device. The remote computer 49 may be another computer, a server, a router, a network PC, a client, a peer device or other common network node, and typically includes many or all of the elements described above relative to the computer 20. The logical connections depicted in FIG. 11 include a local-area network (LAN) 51 and a wide-area network (WAN) 52. Such networking environments are commonplace in office networks, enterprise-wide computer networks, intranets and the Internet, which are all types of networks.

When used in a LAN-networking environment, the computer 20 is connected to the local area network 51 through a network interface or adapter 53, which is one type of communications device. When used in a WAN-networking environment, the computer 20 typically includes a modem 54, a network adapter, a type of communications device, or any other type of communications device for establishing communications over the wide area network 52. The modem 54, which may be internal or external, is connected to the system bus 23 via the serial port interface 46. In a networked environment, program engines depicted relative to the personal computer 20, or portions thereof, may be stored in the remote memory storage device. It is appreciated that the network connections shown are example and other means of communications devices for establishing a communications link between the computers may be used.

In an example implementation, software or firmware instructions for multi-frequency unwrapping may be stored in system memory 22 and/or storage devices 29 or 31 and processed by the processing unit 21. One or more instructions for multi-frequency unwrapping may be stored in system memory 22 and/or storage devices 29 or 31 as persistent datastores. For example, the memory 22 may store instructions to instructions to generate an input phase vector with M phases corresponding to M sampled signals, wherein each of the M signals to be modulated at one of M modulation frequencies, instructions to generate a transformation matrix (T) by combining a dimensionality reducing matrix ($T_{null}$) and a deskewing matrix ($T_{deskew}$), instructions to determine a transformed input phase vector by applying the transformation matrix (T) to the input phase vector, instructions to calculate a rounded transformed input phase vector by rounding the transformed input phase vector to the nearest integer, instructions to generate a one dimensional index value by combining the elements of the rounded transformed input phase vector, instructions to generate a one dimensional lookup table (LUT), wherein the one dimensional LUT to provide a plurality of range disambiguations and instructions to input the one dimensional index value into the one dimensional LUT to determine a range of the object. These instructions may be executable on the processing unit 21.

In contrast to tangible computer-readable storage media, intangible computer-readable communication signals may embody computer readable instructions, data structures, program modules or other data resident in a modulated data signal, such as a carrier wave or other signal transport mechanism. The term "modulated data signal" means a signal that has one or more of its characteristics set or changed in such a manner as to encode information in the signal. By way of example, and not limitation, intangible communication signals include wired media such as a wired network or direct-wired connection, and wireless media such as acoustic, RF, infrared and other wireless media.

Some embodiments may comprise an article of manufacture. An article of manufacture may comprise a tangible storage medium to store logic. Examples of a storage medium may include one or more types of computer-readable storage media capable of storing electronic data, including volatile memory or non-volatile memory, removable or non-removable memory, erasable or non-erasable memory, writeable or re-writeable memory, and so forth. Examples of the logic may include various software elements, such as software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. In one embodiment, for example, an article of manufacture may store executable computer program instructions that, when executed by a computer, cause the computer to perform methods and/or operations in accordance with the described embodiments. The executable computer program instructions may include any suitable type of code, such as source code, compiled code, interpreted code, executable code, static code, dynamic code, and the like. The executable computer program instructions may be implemented according to a predefined computer language, manner or syntax, for instructing a computer to perform a certain function. The instructions may be implemented using any suitable high-level, low-level, object-oriented, visual, compiled and/or interpreted programming language.

The system for secure data onboarding may include a variety of tangible computer-readable storage media and intangible computer-readable communication signals. Tangible computer-readable storage can be embodied by any available media that can be accessed by the time-of-flight system disclosed herein and includes both volatile and nonvolatile storage media, removable and non-removable storage media. Tangible computer-readable storage media excludes intangible and transitory communications signals and includes volatile and nonvolatile, removable and non-removable storage media implemented in any method or technology for storage of information such as computer readable instructions, data structures, program modules or other data. Tangible computer-readable storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other tangible medium which can be used to store the desired information and which can be accessed by the time-of-flight system disclosed herein. In contrast to tangible computer-readable storage media, intangible computer-readable communication signals may embody computer readable instructions, data structures, program modules or other data resident in a modulated data signal, such as a carrier wave or other signal transport mechanism. The term "modulated data signal" means a signal that has one or more of its characteristics set or changed in such a manner as to encode information in the signal. By way of example, and not limitation, intangible communication signals include signals moving through wired media such as a wired network or direct-wired connection, and signals moving through wireless media such as acoustic, RF, infrared and other wireless media.

A physical hardware system to provide multi-frequency unwrapping comprises memory, one or more processor units, one or more sensors, each of the sensors to receive reflection of each of M signals from an object, wherein each of the M signals to be modulated at one of M modulation frequencies, wherein M is greater than or equal to two. The physical hardware system also includes a signal sampling module configured to generate M sampled signals, each of the M sampled signals corresponding to reflection of one of the M signals, and a frequency unwrapping module stored in the memory and executable by the one or more processor units, the frequency unwrapping module configured to generate an input phase vector with M phases corresponding to the M sampled signals, determine an M−1 dimensional vector of transformed phase values by applying a transformation matrix (T) to the input phase vector, determine an M−1 dimensional vector of rounded transformed phase values by rounding the transformed phase values to a nearest integer, determine a one dimensional lookup table (LUT) index value by transforming the M−1 dimensional rounded transformed phase values, and input the index value into the one dimensional LUT to determine a range of the object.

In an alternative implementation of the physical hardware system disclosed herein, the range is determined via phase unwrapping of the input phase vector. In yet alternative implementation of the physical hardware system disclosed herein, the transformation matrix (T) is generated based upon frequency ratios of the modulation frequencies. In another alternative implementation, the transformation matrix (T) maps a noiseless phase vector onto an integer lattice. In yet another alternative implementation, the one dimensional lookup table (LUT), is generated using the transformation matrix (T) and comprises packing M−1 dimensions into one dimension. In yet another alternative implementation, the one dimensional lookup table (LUT) maps to a phase unwrapping vector ($n_1, n_2, \ldots n_M$). In another alternative implementation, the transformation matrix (T) is calculated using a dimensionality reducing matrix comprising a plurality of basis vectors orthogonal to a frequency ratio vector ($m_1, m_2, \ldots m_M$). In one implementation, each of the M signals is an amplitude modulated continuous wave laser signal.

An alternative implementation of the physical hardware system disclosed herein further comprises a confidence interval calculation module configured to calculate confidence intervals using at least one of a calculation based on a difference between a final estimated range and a range corresponding to individual unwrapped phase measurements, calculated from $\theta_i + 2\pi n_i$ for the individual unwrapped phase measurement denoted by i, and a calculation based on a difference between a vector of a rounded transformed phase values (r) and an unrounded vector of transformed phase values (v).

A method to unwrap range ambiguity in a time-of-flight (TOF) system comprises illuminating an object with M signals, wherein each of the M signals being modulated at one of M modulation frequencies, receiving reflection of each of the M signals from the object, generating M sampled signals, each of the M sampled signals corresponding to reflection of one of the M signals, generating an input phase vector with M phases corresponding to M sampled signals, generating a transformation matrix (T) that reduces the dimensionality of the input phase vector from M to M−1 dimensions, applying the transformation matrix (T) to the input phase vector and rounding to the nearest integer, determining an index value by mapping the rounded transformed input phase vector from M−1 dimensions to a one dimensional value, generating a one dimensional lookup table (LUT), wherein the one dimensional LUT providing a plurality of range disambiguation, and inputting the index value into the one dimensional LUT to determine a range ($n_i$) of the object.

In an alternative implementation, the range is determined via phase unwrapping of the input phase vector. In another implementation, the transformation matrix (T) is generated based upon frequency ratios of the modulation frequencies. In yet alternative implementation, the transformation matrix (T) maps a noiseless phase vector onto an integer lattice. In one implementation, the one dimensional LUT, is generated using the transformation matrix (T) and comprises packing M−1 dimensions into one dimension. In yet another implementation, the one dimensional LUT maps to a phase unwrapping vector ($n_1, n_2, \ldots n_M$). In another implementation, the transformation matrix (T) is calculated using a dimensionality reducing matrix comprising a plurality of basis vectors orthogonal to a frequency ratio vector ($m_1, m_2, \ldots m_M$).

A physical article of manufacture disclosed herein includes one or more tangible computer-readable storage media encoding computer-executable instructions for executing on a computer system a computer process, the instructions comprising: instructions to generate an input phase vector with M phases corresponding to M sampled signals, wherein each of the M signals to be modulated at one of M modulation frequencies, instructions to generate a transformation matrix (T) by combining a dimensionality reducing matrix ($T_{null}$) and a deskewing matrix ($T_{deskew}$), instructions to determine a transformed input phase vector by applying the transformation matrix (T) to the input phase vector, instructions to calculate a rounded transformed input phase vector by rounding the transformed input phase vector to the nearest integer, instructions to generate a one dimensional index value by combining the elements of the rounded transformed input phase vector, instructions to generate a one dimensional lookup table (LUT), wherein the one dimensional LUT to provide a plurality of range disambiguations, and instructions to input the one dimensional index value into the one dimensional LUT to determine a range of the object.

The above specification, examples, and data provide a description of the structure and use of exemplary embodiments of the disclosed subject matter. Since many implementations can be made without departing from the spirit and scope of the disclosed subject matter, the claims hereinafter appended establish the scope of the subject matter covered by this document. Furthermore, structural features of the different embodiments may be combined in yet another implementation without departing from the recited claims.

What is claimed is:

1. A physical hardware system to provide multi-frequency unwrapping, comprising:
   memory;
   one or more processor units;
   a light source to generate M signals each being modulated at one of M modulation frequencies;
   one or more sensors, each of the sensors to receive reflection of each of the M signals from an object, wherein M is greater than or equal to two;
   a signal sampling module configured to generate M sampled signals, each of the M sampled signals corresponding to reflection of one of the M signals; and
   a frequency unwrapping module stored in the memory and executable by the one or more processor units, the frequency unwrapping module configured to:
   generate an input phase vector with M phases corresponding to the M sampled signals,
   determine an M−1 dimensional vector of transformed phase values by applying a transformation matrix (T) to the input phase vector,
   determine an M−1 dimensional vector of rounded transformed phase values by rounding the transformed phase values to a nearest integer,
   determine a one dimensional lookup table (LUT) index value by transforming the M−1 dimensional rounded transformed phase values,
   input the index value into a one dimensional LUT to determine a range of the object, and generate the transformation matrix (T) based upon frequency ratios of the modulation frequencies.

2. The physical hardware system of claim 1, wherein the frequency unwrapping module is further configured to generate the one dimensional LUT.

3. The physical hardware system of claim 1, wherein the transformation matrix (T) maps a noiseless phase vector onto an integer lattice.

4. The physical hardware system of claim 1, wherein the frequency unwrapping module is further configured to generate the one dimensional lookup table (LUT) using the transformation matrix (T) and packing M−1 dimensions into one dimension.

5. The physical hardware system of claim 1, wherein the one dimensional lookup table (LUT) maps to a phase unwrapping vector ($n_1, n_2, \ldots n_M$).

6. The physical hardware system of claim 1, wherein the frequency unwrapping module is further configured to generate the transformation matrix (T) using a dimensionality reducing matrix ($T_{null}$) comprising a plurality of basis vectors orthogonal to a frequency ratio vector ($m_1, m_2, \ldots m_M$).

7. The physical hardware system of claim 1, further comprising a confidence interval calculation module configured to calculate confidence intervals using at least one of:
   a. a calculation based on a difference between a final estimated range and a range corresponding to individual unwrapped phase measurements, calculated from $\theta_i + 2\pi n_i$ for the individual unwrapped phase measurement denoted by i, and
   b. a calculation based on a difference between a vector of a rounded transformed phase values (r) and an unrounded vector of transformed phase values (v).

8. The physical hardware system of claim 1, wherein each of the M signals is an amplitude modulated continuous wave laser signal.

9. A method to unwrap range ambiguity in a time-of-flight (TOF) system, the method comprising:
   generate M signals each being modulated at one of M modulation frequencies;
   illuminating an object with the M signals;
   receiving reflection of each of the M signals from the object;
   generating M sampled signals, each of the M sampled signals corresponding to reflection of one of the M signals;
   generating an input phase vector with M phases corresponding to M sampled signals;
   generating a transformation matrix (T) based upon frequency ratios of the modulation frequencies that reduces the dimensionality of the input phase vector from M to M−1 dimensions;
   applying the transformation matrix (T) to the input phase vector and rounding to the nearest integer;
   determining an index value by mapping the rounded transformed input phase vector from M−1 dimensions to a one dimensional value;
   generating a one dimensional lookup table (LUT), wherein the one dimensional LUT provides a plurality of range disambiguations; and
   inputting the index value into the one dimensional LUT to determine a range of the object.

10. The method of claim 9, wherein the range is determined via phase unwrapping of the input phase vector.

11. The method of claim 9, wherein the transformation matrix (T) maps a noiseless phase vector onto an integer lattice.

12. The method of claim 9, wherein the one dimensional LUT, is generated using the transformation matrix (T) and comprises packing M−1 dimensions into one dimension.

13. The method of claim 9, wherein the one dimensional LUT maps to a phase unwrapping vector ($n_1, n_2, \ldots n_M$).

14. The method of claim 9, wherein the transformation matrix (T) is calculated using a dimensionality reducing matrix comprising a plurality of basis vectors orthogonal to a frequency ratio vector ($m_1, m_2, \ldots m_M$).

15. The method of claim 9, where a confidence interval is calculated using at least one of
   a. a calculation based on a difference between a final estimated range and a range corresponding to individual unwrapped phase measurements, calculated from $\theta_i + 2\pi n_i$ for the individual unwrapped phase measurement denoted by i, and
   b. a calculation based on the difference between the vector of rounded transformed phase values (r) and the unrounded vector of transformed phase values (v).

16. A physical article of manufacture including one or more tangible computer-readable storage media, encoding computer-executable instructions for executing on a computer system a computer process, the instructions comprising:
   instructions to generate an input phase vector with M phases corresponding to M sampled signals generated by a signal sampling module configured to generate the M sampled signals, wherein each of the M signals to be modulated at one of M modulation frequencies, wherein the M signals are generated by a light source;
   instructions to generate a transformation matrix (T) by combining a dimensionality reducing matrix ($T_{null}$) and a deskewing matrix ($T_{deskew}$);
   instructions to determine a transformed input phase vector by applying the transformation matrix (T) to the input phase vector;
   instructions to calculate a rounded transformed input phase vector by rounding the transformed input phase vector to the nearest integer;
   instructions to generate a one dimensional index value by combining the elements of the rounded transformed input phase vector;
   instructions to generate a one dimensional lookup table (LUT) using the transformation matrix (T) and packing M−1 dimensions into one dimension, wherein the one dimensional LUT provides a plurality of range disambiguations; and
   instructions to input the one dimensional index value into the one dimensional LUT to determine a range of the object.

17. The physical article of manufacture of claim 16, further comprising instructions to determine the range by phase unwrapping of the input phase vector.

18. The physical article of manufacture of claim 16, wherein the transformation matrix (T) maps a noiseless phase vector onto an integer lattice.

* * * * *